Feb. 15, 1955 W. E. BAKER 2,702,053
PRESSURE MEASURING DEVICE
Filed March 11, 1952

INVENTOR.
WILLIAM E. BAKER
BY
C. R. Miranda
ATTORNEY

United States Patent Office 2,702,053
Patented Feb. 15, 1955

---

2,702,053

PRESSURE MEASURING DEVICE

William E. Baker, Waldwick, N. J., assignor to Bendix Aviation Corporation, Teterboro, N. J., a corporation of Delaware Application March 11, 1952, Serial No. 275,965

3 Claims. (Cl. 137—785)

This invention in general relates to pressure measuring devices and more particularly to a differential pressure actuated device for converting fluid pressure into motion of the device.

The most widely used pressure elements are the diaphragm, the corrugated metal bellows and the Bourdon tube. These elements, when used to detect differential pressure, either require two elements or require that each pressure be applied on opposite sides of a single element i. e., one pressure inside and the other pressure outside the pressure element.

In the application of bellows to pressure measurement, it is necessary to oppose the bellows deflection with a spring whose spring rate is on the order of 5 to 10 times the spring rate of the bellows to minimize the effect of hysteresis inherent in typical metal bellows. This spring and bellows assembly with the necessary end fittings is difficult to assemble and align.

The present invention, therefore, contemplates a novel differential pressure responsive device wherein both pressures are applied to the interior of a single bellows. The interior of the bellows accommodates a partition which comprises a flexible strip for separating the interior into two sealed compartments, each supplied with a different pressure. The strip is secured to opposed movable and fixed ends of the bellows whereby the forces exerted by the differential pressure causes the bellows and the partition to bend in a direction perpendicular to the axis of the bellows and perpendicular to the plane of the partition. The partition of flexible strip serves as a spring to minimize the effect of hysteresis inherent in the bellows.

An object of the present invention, therefore, is to provide a novel differential pressure responsive device.

Another object is to provide a novel differential pressure resposive device wherein a partition separates the interior of a bellows to form two sealed compartments whereby the forces exerted by the differential pressure cause the bellows to deflect.

A further object is to provide a novel differential pressure device wherein a strip of flexible material is secured within a bellows to opposed movable and fixed ends thereof to serve as a spring for restraining deflection of the bellows.

The above and other objects and advantages of the present invention will appear more fully hereinafter from a consideration of the detailed description which follows taken together with the accompanying drawing wherein one embodiment of the invention is illustrated.

In the drawing, wherein like reference characters refer to like parts throughout the several views.

Figure 1:
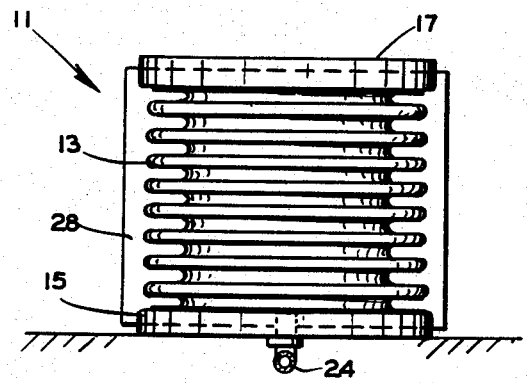
Fig. 1 is an elevational view of the exterior of the differential pressure responsive device embodying the present invention.
Figure 2:
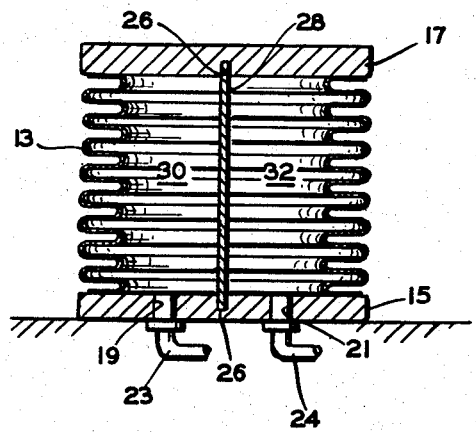
Fig. 2 is an elevational view, in section, of the differential pressure responsive device of Fig. 1, rotated 90 degrees and shown in its undeflected position.

Referring now to the drawing for a more detailed description of the present invention, and more particularly to Fig. 1 wherein one embodiment hereof is clearly illustrated, a differential pressure responsive device, generally designated by the numeral 11, comprises an expansible and contractible metal bellows 13 having sealing and cover plates 15 and 17. Cover plate 15 is fixed and has openings 19 and 21 (Fig. 2) which communicate with a pair of pressure conduits 23 and 24, respectively, the conduits being adapted to apply different pressures to the interior of bellows 13.

Cover plates 15 and 17 each have formed in their inside surfaces a slot 26 for accommodating opposed ends of a partition or flexible strip of material 28, such as beryllium copper, which lies in a plane coincident with the axis of the bellows. Partition 28 serves as a pressure barrier and separates the interior of bellows 13 into two individual sealed compartments 30 and 32. The opposed ends of partition 28 are secured to their respective adjacent cover plates whereby axial elongation and contraction of the bellows is prevented. By extending partition 28 through the wall of the bellows, as seen in Fig. 1, compartments 30 and 32 are effectively sealed from each other.

In the construction of pressure responsive device 11, flexible strip 28 is inserted between two longitudinal split arcuate sections of bellows 13, and cover plates 15 and 17 are positioned against the ends of the bellows. The entire assembly is then subjected to an induction welding process whereby all of the individual elements are securely fastened together to form a sealed unit. In this manner, pressures applied to compartments 30 and 32 are effectively maintained and sealed within bellows 13.

Figure 3:
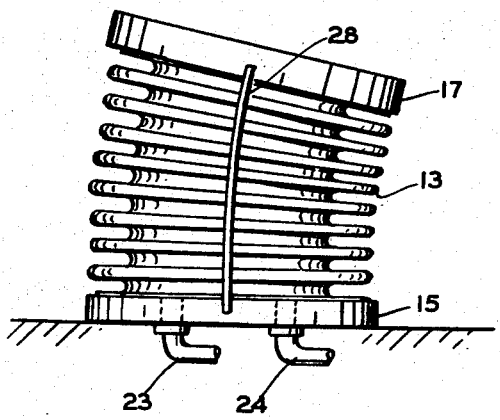
Fig. 3 is an elevational view of the bellows of Fig. 1, rotated 90 degrees and deflected in response to a differential pressure.

Partition 28 serves as a spring whose spring rate is greater than and opposes the spring rate of bellows 13. In this manner, the partition takes the place of the conventional spring means which opposes deflection of a bellows. Partition 28 may be considered as a cantilever whereby the end secured to plate 15 is fixed and the end secured to plate 17 is movable. This is readily seen in Fig. 3, wherein a greater pressure has been applied to compartment 30 than that applied to compartment 32. Since the forces exerted by the pressure in compartment 30 are greater than the forces exerted by the pressure in compartment 32, the movable end of the bellows, and partition 28, deflect in a direction perpendicular to the axis of the bellows and perpendicular to the plane of the partition.

It is to be noted that partition 28 need not be in a plane coincident with the axis of the bellows but may be positioned away therefrom, as long as it is in a plane preferably parallel to the axis of the bellows. If the partition is offset from the center of bellows 13, then the forces exerted by the pressures in each compartment tending to deflect the bellows will be proportionately greater or smaller.

It will now be readily apparent that the present invention provides a novel differential pressure responsive device wherein both pressures are applied to the inside of a single bellows. By employing a resilient partition which serves both as a pressure barrier and a spring, a simple and effective differential pressure responsive device is provided.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. Differential pressure responsive apparatus comprising a hollow device having a resilient wall of generally cylindrical shape, said device having a fixed end and an opposite movable end, and flexible partition means extending longitudinally through said device and secured to said device to divide said device into a pair of differential pressure compartments which are sealed from each other, whereby the differential pressure existing between said compartments causes said device and said partition means to bend in a direction generally perpendicular to the longitudinal axis of said device.

2. A pressure responsive device comprising an expansible and contractible flexible bellows having a fixed end and an opposite movable end, means for covering said ends to seal the interior of the bellows from the atmosphere surrounding said bellows, and a flexible partition secured to the ends of said bellows and extending longitudinally through said bellows to divide said bellows into two separate compartments which are sealed from each other and at least one of which is adapted to be supplied with pressure fluid to develop a differential pressure between said compartments, whereby the differential pressure existing between said compartments causes said bellows and said partition to bend in a direction generally perpendicular to the longitudinal axis of said bellows.

3. A differential pressure responsive device comprising an expansible and contractible flexible bellows having a fixed end and an opposite movable end, first and second rigid cover members secured to respective ends of said bellows to seal the interior of the bellows from the atmosphere surrounding said bellows, a flat flexible partition member secured to said cover members and lying substantially in a plane containing the longitudinal axis of said bellows to divide the bellows into two substantially equal compartments which are sealed from each other, and means for applying a differential pressure between said compartments, whereby the differential pressure existing between said compartments causes said bellows and partition member to bend in a direction generally perpendicular to said longitudinal axis and to said plane.

References Cited in the file of this patent

UNITED STATES PATENTS

| | | |
|---|---|---|
| 420,570 | Bristol | Feb. 4, 1890 |
| 764,572 | Fulton | July 12, 1904 |
| 772,034 | Fulton | Oct. 11, 1904 |